United States Patent
Roh et al.

(10) Patent No.: US 6,794,088 B2
(45) Date of Patent: Sep. 21, 2004

(54) METHOD FOR PREPARING LITHIUM ION POLYMER BATTERY

(75) Inventors: Kwon-Sun Roh, Cheonan-si (KR); Jae-Myoung Lee, Icheon-si (KR); Jon-Ha Lee, Cheonan-si (KR)

(73) Assignee: SKC Limited (KR)

(*) Notice: Subject to any disclaimer, the term of this patent is extended or adjusted under 35 U.S.C. 154(b) by 0 days.

(21) Appl. No.: 10/387,061

(22) Filed: Mar. 11, 2003

(65) Prior Publication Data

US 2003/0175594 A1 Sep. 18, 2003

(30) Foreign Application Priority Data

Mar. 12, 2002 (KR) .................................. 10-2002-0013175

(51) Int. Cl.[7] .......................... H01M 10/08; H01M 10/10
(52) U.S. Cl. ...................................... 429/303; 429/189
(58) Field of Search ................................ 429/189, 203, 429/300–303

(56) References Cited

U.S. PATENT DOCUMENTS

| | | | | |
|---|---|---|---|---|
| 6,051,342 A | * | 4/2000 | Hamano | 429/303 |
| 6,358,651 B1 | * | 3/2002 | Chen | 429/303 |
| 6,537,705 B1 | * | 3/2003 | Hamano | 429/303 |
| 2003/0003367 A1 | * | 1/2003 | Roh | 429/300 |

* cited by examiner

*Primary Examiner*—Mark Ruthkosky
(74) *Attorney, Agent, or Firm*—Anderson Kill & Olick, P.C.

(57) ABSTRACT

The lithium ion polymer battery having high capacity, capacity retention and cycling life is prepared by gelating a gel polymer electrolyte composition comprising an organic solvent, a lithium salt, and a gelling agent composed of a nitrogen-containing polymer and an epoxy group-containing polymer at room temperature according to the present invention free from heating step at a low cost.

10 Claims, 1 Drawing Sheet

METHOD FOR PREPARING LITHIUM ION POLYMER BATTERY

FIELD OF THE INVENTION

The present invention relates to a method of making a lithium ion polymer battery having improved cycling life and self-discharge properties at a low manufacturing cost by way of using a specified gel polymer electrolyte composition gellable at room temperature.

BACKGROUND OF THE INVENTION

Lithium secondary batteries have common structural features that include a cathode, an anode, an organic electrolyte and a lithium ion-permeable separator disposed between the electrodes. The electrical energy is generated by redox reactions occurring on the electrodes. The lithium secondary batteries are classified into two types depending on the kind of electrolyte used: a lithium ion battery which employs a liquid electrolyte; and a lithium ion polymer battery, a solid polymer electrolyte.

Lithium ion polymer batteries are generally preferred over lithium ion batteries because of no risk of liquid electrolyte leakage and the capability of shaping it into any form, e.g., an ultra-thin battery.

Accordingly, many efforts have been made to develope suitable gel polymer electrolyte compositions for use in a lithium ion polymer battery. Japanese Publication No. 11-283672 and Japanese Publication No. 11-283673 disclose a method of preparing a polymer battery, which comprises gelating an electrolytic solution("pre-gel" solution) composed of polyethyleneglycol diacrylate, benzoyl peroxide and an organic electrolyte by heating at 60° C. for 1 hour. U.S. Pat. No. 5,639,573 and U.S. Pat. No. 5,665,265 disclose a method of preparing a stacking polymer battery which comprises a two-phase polymer separator and electrodes, and in which a liquid electrolyte is permeated into the stack by heating at 90° C.

However, the above methods require the step of heating the electrolytic solution at 60° C. or higher, which results in polymer batteries having poor performance characteristics, e.g., low cycling life and high self-discharge properties due to the undesired by-products from a thermal cracking of salts contained in the electrolyte at elevated temperature, and high manufacturing cost due to heating equipments in the process.

SUMMARY OF THE INVENTION

Accordingly, it is an object of the present invention to provide a method of making a lithium ion polymer battery using a gel polymer electrolyte composition gellable at room temperature, which makes it possible to prepare a lithium ion polymer battery having improved cycling life and self-discharge properties.

In accordance with one aspect of the present invention, there is provided a method of preparing a lithium ion polymer battery comprising the steps of introducing a gel polymer electrolyte composition into a battery case comprising at least one electrode stack composed of a cathode, an anode and a separator, and allowing the composition to gel at room temperature.

BRIEF DESCRIPTION OF THE DRAWINGS

The above and other objects and features of the present invention will become apparent from the following description of the invention, when taken in conjunction with the accompanying drawing, wherein.

DETAILED DESCRIPTION OF THE INVENTION

Figure 1:
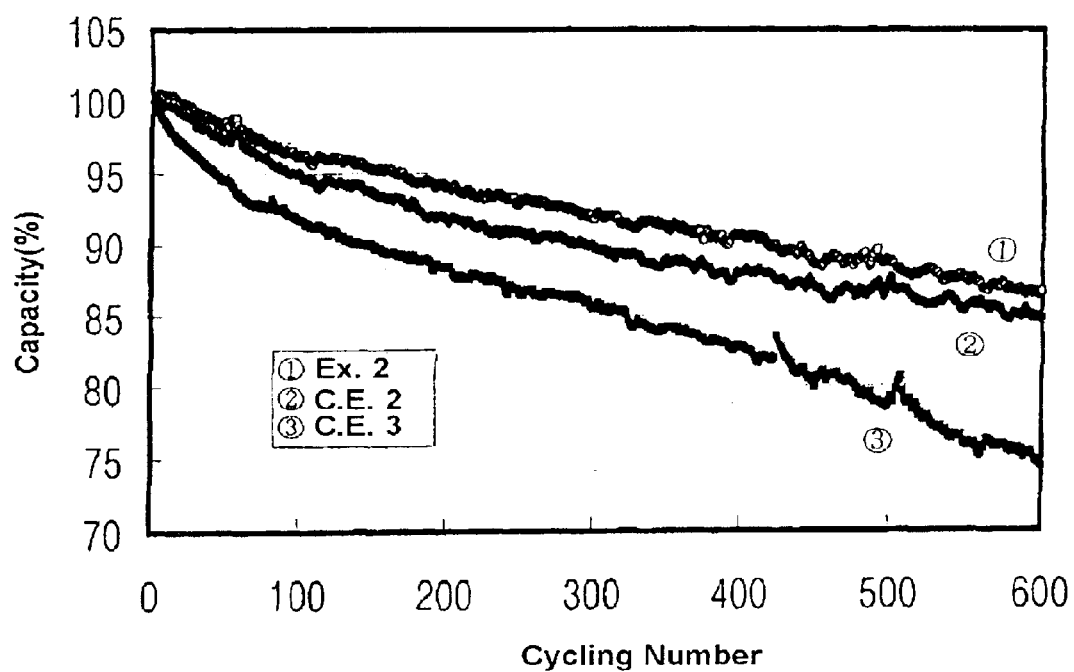
FIG. 1 shows variations of the capacity (%) of the lithium ion polymer batteries obtained in Example 2, and Comparative Examples 2 and 3, as function of cycling number.

The inventive battery made in accordance with the present invention is characterized by having higher capacity, good cycling life and capacity retention due to low undesired reaction at room temperature, and lower cost due to the simple manufacturing process, by way of using a gel polymer electrolyte composition gellable at room temperature.

The gel polymer electrolyte composition comprises a gelling agent composed of a nitrogen-containing polymer and an epoxy group-containing compound in a ratio(w:w) of 2:1 to 5:1.

The gelling agent may be used in an amount ranging from 1.8 to 3.0% by weight based on the total weight of the gel polymer electrolyte composition.

The nitrogen-containing polymer may be used in an amount ranging from 1.5 to 2.0% by weight based on the total weight of the gel polymer electrolyte composition.

When the amount of the gelling agent is less than 1.8, or when the amount of the nitrogen-containing polymer is less than 1.5% by weight, the electrolytic solution does not undergo gelling at room temperature; while when the amount of the gelling agent is more than 3.0%, or when the amount of the nitrogen-containing polymer is more than 2.0% by weight, the gelling occurs too fast from the manufacturing process point of view.

The nitrogen-containing polymer and epoxy group-containing compound may be used in a ratio(w:w) of 2:1 to 5:1, preferably 2:1 to 3:1. When the ratio(w/w) of a nitrogen-containing polymer/epoxy group-containing compound is less than 2, gel formation occurs too fast; and when more than 5, the gellation at room temperature becomes sluggish.

In addition, gelation of the electrolyte composition may be performed at room temperature for 48 to 120 hours. When gelling time is less than 48 hours, the electrolyte cannot fully penetrate into the electrode layers in the electrochemical cell, and it becomes difficult to handle; and when more than 120 hours, the manufacturing cost becomes high.

The electrolyte composition undergoes gelling at room temperature through cross-linking between the nitrogen-containing polymer and the epoxy group-containing compound to give a cross-linked ionic polymer chain.

The nitrogen-containing polymer which may be used in the present invention includes poly(vinylpyridine-co-styrene), poly(vinylpyridine), poly(vinylpyrrolidinone), poly(vinylpyridine acrylate), polypyrrole and polyaniline.

Further, the epoxy group-containing compound which may be used in the present invention includes butanediol diglycidylether, 3,4-epoxycyclhexylmethyl-3',4'-epoxycyclohexane carboxylate,glycidyl dodecafluoroheptylether, polypropyleneglycol diglycidylether, butadiene diepoxide, cyclohexene oxide, cyclopentene oxide, diepoxy cyclooctane, ethyleneglycol diglycidylether and 1,2-epoxyhexane.

Exemplary lithium salts that may be used in the present invention are $LiPF_6$, $LiAsF_6$, $LiClO_4$, $LiN(CF_3SO_2)_2$, $LiBF_4$, $LiCF_3SO_3$, $LiSbF_6$ and a mixture thereof The lithium salt may be present at a concentration ranging from 0.5 to 2.0 M in an organic solvent. When the concentration of the salt is less than 0.5 M, the capacity becomes poor; and when more than 2.0 M, poor cycling life property results.

Representative examples of the organic solvent used in the present invention include propylene carbonate, ethylene carbonate, diethyl carbonate, dimethyl carbonate, ethylmethyl carbonate, dipropyl carbonate, dimethoxyethane, diethoxyethane, vinylene carbonate, gamma-butyrolactone, ethylene sulfite and propylene sulfite.

The gel polymer electrolyte may be prepared by simple gellation of said electrolyte composition at room temperature.

Typically, a cathode composition, i.e., a mixture of a cathode active material, a conducting agent, a binder and a solvent, may be coated directly on an aluminum current collector, or laminated in the form of a film on an aluminum current collector to form a cathode sheet.

The cathode active material may be lithium-containing metal oxides such as $LiCoO_2$, $LiMn_2O_4$ and $LiNiO_2$. The conducting agent may be carbon black; the binder may be vinylidene fluoride/hexafluoropropylene copolymers, polyvinylidene fluoride (PVDF), polyacrilonitrile, polymethylmetacrilate or polytetrafluoroethylene; and the solvent may be N-methlpyrrolidone (NMP) or acetone. The conducting agent, the binder and the solvent may be used in an amount ranging from 1 to 10 parts by weight, from 2 to 10 parts by weight and from 30 to 100 parts by weight based on 100 parts by weight of the cathode active material, respectively.

Also, an anode composition, i.e., a mixture of an anode active material, a conducting agent, a binder and a solvent, may be coated directly on a copper current collector, or laminated in the form of a film on a copper current collector to form an anode sheet.

Representative examples of the anode active material may include carbon-based materials and graphite. The conducting agent, the binder and the solvent, which may be the same as those used in the cathode composition, may be used in an amount of below 10 parts by weight, ranging from 2 to 10 parts by weight and from 30 to 100 parts by weight based on 100 parts by weight of the anode active material, respectively. If necessary, a plasticizer may be further added to said cathode and anode compositions to form porous electrode sheets.

Further, a separator which is interposed between the cathode and the anode sheets may be of a microporous sheet made from, for example, a polymeric material such as polyethylene and polypropylene.

An appropriate separator sheet is located between the cathode and the anode sheets to form an electrode stack. The electrode stack may be wound or stacked, placed into a cylindrical or angular battery case and then sealed, followed by injecting the gel polymer electrolyte composition gellable at room temperature thereinto to prepare a lithium ion polymer battery.

The following Example and Comparative Examples are given for the purpose of illustration only, and are not intended to limit the scope of the invention.

<Preparation of a Gel Polymer Electrolytic Solution>

EXAMPLE 1

Various amounts of poly(vinylpyridine-co-styrene) (m.w. 220,000, PVPS; Aldrich) and butanediol diglycidyl ether (m.w. 202.25, BDDGE; Aldrich) were dissolved in 1 M $LiPF_6$ in EC-DMC-DEC(1:1:1 volume of ethylene carbonate, dimethyl carbonate and diethyl carbonate; to form various gel polymer electrolytic solution as shown in Table 1 and the respective gelling time was measured at room temperature and 65° C.

TABLE 1

| Electrolytic solution No. | Amount | | | Gelling time (hrs) | |
|---|---|---|---|---|---|
| | PVPS (wt. %) | BDDGE (wt. %) | ratio (w/w) of PVPS/BDDGE | room temperature | 65° C. |
| 1 | 1.3 | 1.15 | 1.1:1 | No gelation | 144 |
| 2 | 1.5 | 0.4 | 3.8:1 | 96 | 15 |
| 3 | 1.5 | 0.6 | 2.5:1 | 72 | 15 |
| 4 | 1.5 | 0.68 | 2.2:1 | 72 | 15 |
| 5 | 1.5 | 1.1 | 1.4:1 | 24 | 15 |
| 6 | 1.6 | 1.1 | 1.5:1 | 24 | 15 |
| 7 | 1.6 | 0.4 | 4.0:1 | 96 | 15 |
| 8 | 1.7 | 1.1 | 1.5:1 | 24 | 5 |
| 9 | 1.7 | 0.4 | 4.25:1 | 96 | 15 |
| 10 | 1.7 | 0.2 | 8.5:1 | 144 | 20 |

As shown in Table 1, when the amount of the nitrogen-containing PVPS is less than 1.5% by weight based on the total weight of the electrolte composition (electrolytic solution No. 1), no gellation occurred at room temperature. Further, when the nitrogen-containing polymer(PVPS)/epoxy group-containing compound(BDDGE) ratio(w/w) is less than 2(electrolytic solution No. 5, 6 and 8), gel formation occurred within 24 hours which is too fast for production application; while if the ratio is more than 5(electrolytic solution No. 10), gelling time at room temperature within 24 hours which is too fast for production application; while if the ratio is more than 5(electrolytic solution No. 10), gelling time at room temperature is unacceptably long.

COMPARATIVE EXAMPLE 1

The procedure of Example 1 was repeated except that dibromoxylene instead of BDDGE was used as a cross-linking agent, to obtain a gel polymer electrolytic solution.

The gelling time of the prepared electrolytic solution was more than 1 month at room temperature, and gellation occurred only at 65° C.

<Preparation of a Lithium Ion Polymer Battery>

EXAMPLE 2

88 g of $LiCoO_2$(Seimi), 6.8 g of carbon black(Cabot), 5.2 g of polyvinylidene fluoride(Solvay) and 200 g of N-methylpyrrolidone(Aldrich) were mixed to form a cathode composition. The cathode composition was coated on an aluminum foil and dried to prepare a 122 μm thick cathode sheet.

93.76 g of mesophase carbon micro bead (MCMB 25-28, Osaka gas), 6.24 g of polyvinylidene fluoride(Solvay) and 180 g of N-methylpyrrolidone(Aldrich) were mixed to form an anode composition. The anode composition was coated on a copper foil and dried to prepare a 120 μm thick anode sheet.

A polypropylene separator(25 μm, 2300 microporous film; Cellgard) sheet was disposed between the cathode and anode sheets to form an electrode stack. The electrode stack was wound in a jellyroll manner, placed into an aluminum can and then sealed with a bar sealer. Subsequently, each of electrolytic solutions No. 2, 4, 7 and 9 obtained in Example 1 was injected into the sealed can through an inlet, allowed to gel at room temperature for 5 days, and then degassed, to obtain a lithium ion polymer battery.

COMPARATIVE EXAMPLE 2

The procedure of Example 2 was repeated except that the gelation was performed at 65° C. for 15 hours, to obtain a lithium ion polymer battery.

COMPARATIVE EXAMPLES 3 and 4

The procedure of Example 2 was repeated except that the gelation of the electrolytic solution prepared in Comparative Example 1 was performed at 65° C. for 48 and 32 hours, respectively, to obtain two lithium ion polymer batteries (Comparative Examples 3 and 4, respectively).

Battery Performance Characteristics

The capacity retention (%) of each of the lithium ion polymer batteries obtained in Example 2 and Comparative Examples 2, 3 and 4 are shown in Table 2, and the capacity (%) change with respect to the cycling number were measured. The results are shown in FIG. 1, wherein charge cut-off voltage is 4.2 V and discharge cut-off voltage is 2.75 V. The capacity retention (%) and irreversible loss (%) were calculated based on following equations (1) and (2).

$$\text{Capacity retention } (\%) = (D3/D) \times 100 \quad (1)$$

$$\text{Irreversible loss } (\%) = \{(D-D3)/D\} \times 100 \quad (2)$$

D: Nominal capacity of the battery.

D2: First discharge capacity without charge after aging the battery for 30 days at charge state.

D3: Discharge capacity at third cycling after aging the battery for 30 days at charge state.

TABLE 2

|  | Capacity retention (%) | Irreversible loss (%) |
|---|---|---|
| Example 2 | | |
| Solution No. 2 | 94.5 | 2.5 |
| Solution No. 4 | 94.8 | 2.2 |
| Solution No. 7 | 95.2 | 2.3 |
| Solution No. 9 | 95.0 | 2.5 |
| Comparative Example 2 | 91.8 | 7.0 |
| Comparative Example 3 | 85.3 | 7.7 |
| Comparative Example 4 | 85.7 | 7.3 |

As shown in Table 2 and FIG. 1, the batteries obtained in Example 2 exhibit much improved properties in terms of capacity retention and cycling life, as compared with the batteries obtained in Comparative Examples 2, 3 and 4. Also, the capacity of the inventive battery exhibits a maximum value, which verifies the advantage of gellation process at room temperature. Therefore, the inventive method can be advantageously used in preparing an improved lithium ion polymer battery.

While the embodiments of the subject invention have been described and illustrated, it is obvious that various changes and modifications can be made therein without departing from the spirit of the present invention which should be limited only by the scope of the appended claims.

What is claimed is:

1. A method of preparing a lithium ion polymer battery comprising the steps of introducing a gel polymer electrolyte composition into a battery case comprising at least one electrode stack composed of a cathode, an anode and a separator, and allowing the composition to gel at room temperature, wherein the gel polymer electrolyte composition comprises a gelling agent, an organic solvent and a lithium salt, said gelling agent comprising a nitrogen-containing polymer and an epoxy group-containing compound in a ratio (w:w) of 2:1 to 5:1.

2. The method of claim 1, wherein gellation is performed for 48 to 120 hours at room temperature.

3. The method of claim 1, wherein the gelling agent is used in an amount ranging from 1.8 to 3.0% by weight based on the total weight of the gel polymer electrolyte composition.

4. The method of claim 1, wherein the nitrogen-containing polymer is used in an amount ranging from 1.5 to 2.0% by weight based on the total weight of the gel polymer electrolyte composition.

5. The method of claim 1, wherein the nitrogen-containing polymer is selected from the group consisting of poly(vinylpyridine-co-styrene), poly(vinylpyridine), poly(vinylpyrrolidinone), poly(vinylpyridine acrylate), polypyrrole and polyaniline.

6. The method of claim 1, wherein the epoxy group-containing compound is selected from the group consisting of butanediol diglycidylether, 3,4-epoxycyclohexylmethyl-3',4'-epoxycyclohexane carboxylate, glycidyl dodecafluoroheptylether, polypropyleneglycol diglycidylether, butadiene diepoxide, cyclohexene oxide, cyclopentene oxide, diepoxy cyclooctane, ethyleneglycol diglycidylether and 12-epoxyhexane.

7. The method of claim 1, wherein the nitrogen-containing polymer and the epoxy group-containing compound are poly(vinylpyridine-co-styrene) and butanediol diglycidylether, respectively.

8. The method of claim 1, wherein the lithium salt is selected from the group consisting of LiPF6, LiAsF6, LiClO4, LiN(CF3SO2)2, LiBF4, LiCF3SO3 and LiSbF6.

9. The method of claim 1, wherein the concentration of the lithium salt in the organic solvent is in the range from 0.5 to 2.0M.

10. The method of claim 1, wherein the organic solvent is selected from the group consisting of propylene carbonate, ethylene carbonate, diethyl carbonate, dimethyl carbonate, ethylmethyl carbonate, dipropyl carbonate, dimethoxyethane, diethoxyethane, vinylene carbonate, gamma-butyrolactone, ethylene sulfite and propylene sulfite.

* * * * *